3,157,701
DIHALOPHOSPHONIUM SALTS

Angelo John Speziale, Creve Coeur, and Kenneth Wayne Ratts, Overland, Mo., assignors to Monsanto Company, a corporation of Delaware
No Drawing. Filed May 18, 1962, Ser. No. 196,001
16 Claims. (Cl. 260—558)

This invention relates to the preparation of phosphonium halides and to novel compositions prepared by the new procedure. More specifically, the invention is directed to carbamyl dihalomethyl trisubstituted halides and to a method for their preparation by the interreaction of tertiary phosphine dihalomethylenes and formamyl halides.

The reaction may be represented by the structural equation:

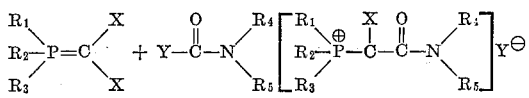

wherein $R_1$, $R_2$ and $R_3$ are the same or different radicals selected from the class consisting of phenyl, cyclohexyl and aliphatic hydrocarbon radicals of up to six carbon atoms, including alkyl, alkenyl and alkynyl radicals; wherein X is a halogen of the group consisting of chlorine, bromine and iodine; wherein Y is a halogen of the group consisting of chlorine and bromine; and wherein $R_4$ and $R_5$ are selected from the group consisting of hydrogen atoms, cyclohexyl, phenyl and aliphatic hydrocarbon radicals of up to six carbon atoms, including alkyl, alkenyl and alkynyl radicals, providing that one of the $R_4$ and $R_5$ radicals is not hydrogen.

These reactions are conducted in liquid hydrocarbon solutions, for example in benzene, toluene, petroleum ether, hexane, pentane or the chlorinated hydrocarbons, such as chloroform, carbon tetrachloride and ethylene dichloride. The reagents are added to the selected solvent. Temperatures below room temperatures, for example $-20°$ C. may sometimes be advantageous. If desired, for the purpose of increasing the reaction rate temperatures above room temperatures may be used, for example, up to reflux temperature of the reaction mixture. As the reaction proceeds the phosphonium salts are precipitated in crude form.

The solid products are purified by recrystallization from hydrocarbon solutions, such as benzene, hexane, toluene or the chlorinated solvents such as chloroform, ethylene dichloride and carbon tetrachloride.

Example 1

Approximately equimolar proportions of triphenyl phosphine dichloromethylene and N,N-diphenylcarbamyl chloride were dissolved in benzene at 0–10° C. A brown precipitate was formed immediately and the reaction mixture was allowed to warm to room temperature. The reaction mixture was then gradually heated to reflux temperature and after cooling, was filtered to recover the solid product identified as N,N-diphenylcarbamyl dichloromethyl triphenylphosphonium chloride. The product was recrystallized by dissolving in chloroform and cooling the solution.

Example 2

The procedure of the preceding example was repeated except by using triethyl phosphine dichloromethylene and the formamyl chloride as the reactants. The product recovered from the reaction mixture and recrystallized from chloroform was the carbamyl dichloromethyl triethylphosphonium chloride.

Example 3

Various combinations of the tertiary phosphine dihalomethylenes and the carbamyl halides produce the following compounds:

N-phenyl-N-ethylcarbamyl dichloromethyl tri-n-butylphosphonium chloride
N(6-aminohexyl)carbamyl dichloromethyl tri-n-butylphosphonium chloride
N,N-diethylcarbamyl dichloromethyl triphenylphosphonium chloride
N,N-diallylcarbamyl dichloromethyl triphenylphosphonium chloride
N-cyclohexyl-N-ethylcarbamyl dibromomethyl triethylphosphonium bromide
N,N-dipropylcarbamyl diiodomethyl triphenylphosphonium chloride
N-n-propylcarbamyl dichloromethyl triallylphosphonium chloride
N,N-dipropargylcarbamyl dibromomethyl triphenylphosphonium bromide
N,N-dimethylcarbamyl dichloromethyl tricyclohexylphosphonium chloride
N,N-dicyclohexylcarbamyl diiodomethyl tributynylphosphonium chloride The new class of compounds may be used in the preparation of $\alpha$-haloacetamides with substituents on the amide nitrogen atoms, the latter having useful grass specific herbicidal properties. These end poducts, which are well known in chemical literature, may be prepared by reacting the phosphonium salts herein claimed with a strong alkali, such as sodium hydroxide, and then hydrolyzing the resulting compound in the presence of a catalyst such as alumina to split off a tertiary phosphine oxide and yield an $\alpha$-chloroacetamide.

Although the new compounds are described above with reference to specific preparations, it is not intended that the details thereof shall be limitations on the scope of the invention except to the extent incorporated in the following claims.

The embodiments of the invention in which an exclusive property or privilege is claimed are defined as follows:

1. A chemical compound having the structure

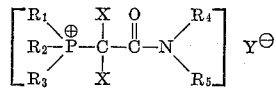

wherein $R_1$, $R_2$ and $R_3$ are selected from the group consisting of cyclohexyl, phenyl and aliphatic hydrocarbon having up to 6 carbon atoms; wherein $R_4$ and $R_5$ are selected from the group consisting of hydrogen, cyclohexyl, phenyl, aliphatic hydrocarbon having up to 6 carbon atoms, provided that not more than one of the $R_4$ and $R_5$ is hydrogen; wherein Y is of the group consisting of chlorine and bromine; and wherein X is selected from the group consisting of chlorine, bromine and iodine.

2. Triphenyl-N,N-dialkyl carbamyl dichloromethyl phosphonium chloride wherein the alkyl has up to 6 carbon atoms.

3. Tri-n-butyl-N,N-dialkyl carbamyl dichloromethyl phosphonium chloride wherein the alkyl has up to 6 carbon atoms.

4. Triphenyl-N,N-diallylcarbamyl dichloromethyl phosphonium chloride.

5. Triphenyl-N,N-diethylcarbamyl dichloromethyl phosphonium chloride.

6. Triphenyl-N-cyclohexylcarbamyl dichloromethyl phosphonium chloride.

7. N(6-aminohexyl)carbamyl dichloromethyl phosphonium chloride.

8. N-ethyl,N-phenylcarbamyl dichloromethyl triphenylphosphonium chloride.

9. The method of preparing compounds of the structure

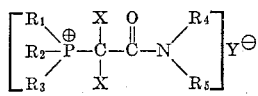

wherein $R_1$, $R_2$ and $R_3$ are selected from the group consisting of cyclohexyl, phenyl and aliphatic hydrocarbon having up to 6 carbon atoms; wherein $R_4$ and $R_5$ are selected from the group consisting of hydrogen, cyclohexyl, phenyl, aliphatic hydrocarbon having up to 6 carbon atoms, provided that not more than one of the $R_4$ and $R_5$ is hydrogen; wherein Y is of the group consisting of chlorine and bromine; and wherein X is selected from the group consisting of chlorine, bromine and iodine; which comprises contacting in an inert organic liquid suspension a compound of the structure

with a compound of the structure

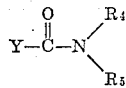

10. The method of preparing N,N-dialkyl carbamyl dichloromethyl triphenylphosphonium chloride wherein the alkyl group has up to 6 carbon atoms, which comprises contacting triphenyl phosphine dichloromethylene with N,N-dialkylformamyl chloride wherein the alkyl has up to 6 carbon atoms.

11. The method of preparing N,N-dialkyl carbamyl dichloromethyl tri-n-butylphosphonium chloride wherein the alkyl group has up to 6 carbon atoms, which comprises contacting tri-n-butyl phosphine dichloromethylene with N,N-dialkylformamyl chloride wherein the alkyl has up to 6 carbon atoms.

12. The method of preparing N,N-diallylcarbamyl dichloromethyl triphenylphosphonium chloride, which comprises contacting triphenyl phosphine dichloromethylene with N,N-diallylformamyl chloride in an inert organic solvent.

13. The method of preparing N,N-diethylcarbamyl dichloromethyl triphenylphosphonium chloride, which comprises heating triphenyl phosphine dichloromethylene with N,N-diethylformamyl chloride in an inert organic solvent.

14. The method of preparing N-cyclohexyl-N-methylcarbamyl dichloromethyl triphenylphosphonium chloride, which comprises contacting triphenyl phosphine dichloromethylene with N-methyl-N-cyclohexylformamyl chloride in an inert organic solvent.

15. The method of preparing N-ethyl-N-phenyl-carbamyl dichloromethyl triphenylphosphonium chloride, which comprises contacting triphenyl phosphine dichloromethylene with N-ethyl-N-phenylformamyl chloride in an inert organic solvent.

16. The method of preparing N(6-aminohexyl)carbamyldichloromethyl triphenylphosphonium chloride, which comprises contacting triphenyl phosphine dichloromethylene with N(6-aminohexyl)formamyl chloride in an inert organic solvent.

References Cited in the file of this patent

UNITED STATES PATENTS 3,005,013    Grayson et al.  ----------  Oct. 17, 1961

OTHER REFERENCES

Trippet et al.: Jour. Chem. Soc. (London), Part 4, pages 3874–3876 (1959).